United States Patent
Nakayama et al.

(10) Patent No.: US 12,112,781 B2
(45) Date of Patent: Oct. 8, 2024

(54) OPTICAL RECORDING MEDIUM SUBSTRATE, OPTICAL RECORDING MEDIUM, AND METHOD OF MANUFACTURING OPTICAL RECORDING MEDIUM SUBSTRATE

(71) Applicant: SONY CORPORATION, Tokyo (JP)

(72) Inventors: Hiroshi Nakayama, Miyagi (JP); Hiroyuki Takemoto, Miyagi (JP); Minoru Kikuchi, Miyagi (JP); Minoru Matsuura, Miyagi (JP)

(73) Assignee: SONY CORPORATION, Tokyo (JP)

( * ) Notice: Subject to any disclaimer, the term of this patent is extended or adjusted under 35 U.S.C. 154(b) by 805 days.

(21) Appl. No.: 16/519,426

(22) Filed: Jul. 23, 2019

(65) Prior Publication Data

US 2020/0051590 A1 Feb. 13, 2020

Related U.S. Application Data

(62) Division of application No. 14/074,965, filed on Nov. 8, 2013, now abandoned.

(30) Foreign Application Priority Data

Nov. 15, 2012 (JP) .................. 2012-251413

(51) Int. Cl.
*G11B 7/00* (2006.01)
*B29C 45/00* (2006.01)
(Continued)

(52) U.S. Cl.
CPC ............ *G11B 7/2534* (2013.01); *B29C 45/00* (2013.01); *B29C 45/0001* (2013.01); *B29D 17/005* (2013.01); *Y10T 428/31507* (2015.04)

(58) Field of Classification Search
CPC ............................ B29C 45/00; B29C 45/0001
See application file for complete search history.

(56) References Cited

U.S. PATENT DOCUMENTS 4,997,903 A * 3/1991 Okamoto ................ C08L 69/00
528/196
5,251,202 A * 10/1993 Kaneko .................. G11B 7/243
(Continued)

FOREIGN PATENT DOCUMENTS

JP 05-177948 A 7/1993
JP 2007-293974 A 11/2007
(Continued)

OTHER PUBLICATIONS

Sepe, Michael. "The Importance of Melt and Mold Temperature." Plastics Technology, Nov. 28, 2011, www.ptonline.com/articles/the-importance-of-melt-mold-temperature. (Year: 2011).*
(Continued)

*Primary Examiner* — Seyed Masoud Malekzadeh
*Assistant Examiner* — Andres E. Behrens, Jr.
(74) *Attorney, Agent, or Firm* — CHIP LAW GROUP (57) ABSTRACT

There is provided an optical recording medium substrate including a polycarbonate in which an average molecular weight is in a range from 15000 to 16000, and mass per unit volume at 25° C. is in a range from 1.1930 g/cm³ to 1.2000 g/cm³.

5 Claims, 6 Drawing Sheets (51) Int. Cl.
  B29D 17/00    (2006.01)
  G11B 7/2534   (2013.01)

(56) References Cited

U.S. PATENT DOCUMENTS

| | | | | |
|---|---|---|---|---|
| 5,846,626 | A * | 12/1998 | Kashiwagi | G11B 7/26 |
| | | | | 428/64.2 |
| 6,064,642 | A | 5/2000 | Okubo | |
| 6,596,367 | B2 * | 7/2003 | Van Der Tempel | ........................ |
| | | | | G11B 7/24047 |
| 6,636,476 | B1 * | 10/2003 | Arakawa | G11B 23/0021 |
| 7,327,643 | B2 * | 2/2008 | Iwazawa | G11B 7/0956 |
| | | | | 369/53.19 |
| 2002/0176957 | A1 | 11/2002 | Mino et al. | |
| 2003/0099185 | A1 * | 5/2003 | Nakamura | G11B 7/2585 |
| | | | | 369/283 |
| 2003/0223350 | A1 * | 12/2003 | Takazawa | G11B 7/26 |
| 2006/0133256 | A1 | 6/2006 | Kinoshita et al. | |
| 2006/0280062 | A1 * | 12/2006 | Ichihara | G11B 7/0956 |
| 2007/0105048 | A1 | 5/2007 | Hiroki | |
| 2007/0269652 | A1 | 11/2007 | Kubo | |
| 2008/0273441 | A1 * | 11/2008 | Van Der Tempel | ........................ |
| | | | | G11B 7/2542 |
| 2009/0135706 | A1 | 5/2009 | Noguchi et al. | |
| 2009/0196141 | A1 | 8/2009 | Mikoshiba et al. | |
| 2010/0035013 | A1 | 2/2010 | Kubo et al. | |
| 2010/0173114 | A1 | 7/2010 | Kurose et al. | |
| 2011/0202942 | A1 | 8/2011 | Fujimoto et al. | |

FOREIGN PATENT DOCUMENTS

| | | | | |
|---|---|---|---|---|
| JP | 2009-271970 A | | 11/2009 | |
| WO | WO-2005123842 A1 * | | 12/2005 | ........... G11B 7/2472 |

OTHER PUBLICATIONS

Jian Wang (Mar. 23, 2012). PVT Properties of Polymers for Injection Molding, Some Critical Issues for Injection Molding, Dr. Jian Wang (Ed.), ISBN: 978-953-51-0297-7, (Year: 2012).*

Collins, Patrick. "What Causes Polycarbonate Parts to Crack?" Matrix Plastic Products, Jul. 17, 2009, www.matrixplastic.com/blog-1/75-possibilities-of-why-a-polycarbonate-pc-part-is-cracking. (Year: 2009).*

Ravago. "Processing Data Sheet Polycarbonate Glass Filled and Flame Retardant Grades ." Chrome-extension://Efaidnbmnn-nibpcajpcglclefindmkaj/https://rme.ravagomanufacturing.com/sites/default/files/PROCESSING%20-%20Sicoklar%20FR%2BGF%20%28E58%2C%20UG58%29%20-%20ENG.pdf, May 2006. (Year: 2006).*

Polycarbonate—Wikipedia, the Free Encyclopedia. https://web.archive.org/web/20121108072302/http://en.wikipedia.org/wiki/Polycarbonate. Accessed Nov. 8, 2012 (Year: 2012).*

"Polycarbonate." Polymer Processing, 2001, www.polymerprocessing.com/polymers/PC.html#:~:text=Melting%20temperature%3A%202225oC,%3A%201.20%20g%2Fcm3. (Year: 2003).*

"Polycarbonate." Wikipedia, Nov. 14, 2012, web.archive.org/web/20121114212649/https://en.wikipedia.org/wiki/Polycarbonate. (Year: 2012).*

Seungman Sohn (Ph.D.)—Virginia Polytechnic Institute and State University, 2000.; Publication No. AAI3142038; ISBN: 9780496890729; Source: Dissertation Abstracts International, vol. 65-07, Section: B, p. 3652.; 263 (Year: 2000).*

AZoM. "Polycarbonate—Supplier Data by Goodfellow." AZoM.com, Apr. 11, 2003, www.azom.com/article.aspx?ArticleID=1934. (Year: 2003).*

Walsh, D., & Zoller, P. (1995). Standard Pressure Volume Temperature Data for Polymers (1st ed.). CRC Press. p. 337. https://books.google.com/books?hl=en&lr=&id=e_LNtlIMIqEC&oi=fnd&pg=PA1&dq=(Zoller+%26+Walsh,+1995).&ots=nKoL.wOyCVQ&sig=16XlxBZMBso3UEoROf4NoCAIIRw#v=onepage&q&f=false (Year: 1995).*

WO-2005123842 (Berneth ) Dec. 2005 (online machine translation), [Retrieved on May 26, 2023]. Retrieved from: Espacenet (Year: 2005).*

Henri Lacroix Issued: Jul. 2007 Thermohygroelastic properties of polymethylmethacrylate https://citeseerx.ist.psu.edu/document?repid=rep1&type=pdf&doi=3bd1717ed730fe2ab3e12f5fc6e9957a82340fd0 (Year: 2007).*

Claude R. Mallet, "Rapid Analysis of Bisphenols A, B and E in Baby Food and Infant formula Using Acquity UPLC with the Xevo TQD", Waters Corporations, Jan. 2012, pp. 1-9.

"Polycarbonate", polycarbonate of bisphenol A, http://www.polymerprocessing.com/polymers/PC.html, 2000, 02 pages.

Non-Final Office Action for U.S. Appl. No. 14/074,965, issued on Jan. 12, 2016, 10 pages.

Non-Final Office Action for U.S. Appl. No. 14/074,965, issued on Jun. 23, 2017, 11 pages.

Non-Final Office Action for U.S. Appl. No. 14/074,965, issued on Jun. 13, 2018, 14 pages.

Final Office Action for U.S. Appl. No. 14/074,965, issued on Jul. 21, 2016, 16 pages.

Final Office Action for U.S. Appl. No. 14/074,965, issued on Dec. 26, 2017, 16 pages.

Final Office Action for U.S. Appl. No. 14/074,965, issued on Jan. 23, 2019, 14 pages.

Advisory Action for U.S. Appl. No. 14/074,965, issued on Oct. 6, 2016, 03 pages.

Advisory Action for U.S. Appl. No. 14/074,965, issued on Mar. 27, 2018, 03 pages.

Advisory Action for U.S. Appl. No. 14/074,965, issued on Apr. 25, 2019, 06 pages.

* cited by examiner

WEIGHT OF ONLY SUBSTRATE m(g)

FIG. 2B

WEIGHT OF WATER AND CONTAINER M(g)

FIG. 2C

WEIGHT IN STATE IN WHICH SUBSTRATE
IS HUNG UNDER WATER M(g)

FIG. 3A

4: OPTICAL RECORDING MEDIUM SUBSTRATE

OPTICAL RECORDING MEDIUM SUBSTRATE, OPTICAL RECORDING MEDIUM, AND METHOD OF MANUFACTURING OPTICAL RECORDING MEDIUM SUBSTRATE

CROSS REFERENCE TO RELATED APPLICATIONS

The present application is a divisional application of U.S. patent application Ser. No. 14/074,965, filed Nov. 8, 2013, which claims the benefit of Priority from Japanese Priority Patent Application JP 2012-251413 filed Nov. 15, 2012, the entire contents of which are incorporated herein by reference.

BACKGROUND

The present disclosure relates to an optical recording medium substrate that reduces warpage, an optical recording medium using the optical recording medium substrate, and a method of manufacturing the optical recording medium substrate.

An optical recording medium is very excellent as a medium for supplying software (including music, videos, etc.), and has become widespread in a comprehensive range of fields due to the convenience of handling, the ease of mass production, the reduction of manufacturing cost, etc. In addition, improvement in high density of an optical recording medium is in progress, and a Blu-ray disc (registered trademark) or the like implementing a significantly high capacity compared to, for example, a compact disc (CD) and a digital versatile disc (DVD) of the related art, has become widespread.

When these optical recording media are warped, it is difficult to exhibit good reproduction characteristics. This is because aberration occurs in a light spot.

In Japanese Unexamined Patent Application Publication No. 2009-271970, technology for laminating an optical transmission layer (transparent cover layer) formed by an active energy line curable resin having predetermined characteristics in order to suppress the warpage of an optical recording medium (particularly, a Blu-ray disc) has been disclosed.

SUMMARY

Incidentally, when the optical recording medium of the related art does not have sufficient rigidity and, for example, is stored for a long period of time in a horizontal state in which both ends of the optical recording medium between which the center is interposed are inserted into holding grooves of a storage cartridge, there is a possibility of warpage occurring and it is difficult to exhibit good reproduction characteristics. In storage in a high-temperature environment, this may be remarkably shown. This is one factor shortening a life of the optical recording medium. If the warpage of the optical recording medium stored in such a horizontal state can be reduced, this will greatly contribute to long-term storage of the optical recording medium.

It is desirable to provide a long-life optical recording medium substrate which reduces warpage and has good reproduction characteristics even when an optical recording medium is stored for a long period of time in a normal- or high-temperature environment in a horizontal state, and an optical recording medium using the same.

According to an embodiment of the present disclosure, there is provided an optical recording medium substrate including a polycarbonate in which an average molecular weight is in a range from 15000 to 16000, and mass per unit volume at 25° C. is in a range from 1.1930 g/cm$^3$ to 1.2000 g/cm$^3$.

According to another embodiment of the present disclosure, there is provided an optical recording medium including an optical recording medium substrate which is a polycarbonate in which an average molecular weight is in a range from 15000 to 16000, and mass per unit volume at 25° C. is in a range from 1.1930 g/cm$^3$ to 1.2000 g/cm$^3$.

Further, according to still another embodiment of the present disclosure, there is provided a method of manufacturing an optical recording medium substrate, including filling and injection-molding a polycarbonate in which an average molecular weight is in a range from 15000 to 16000 in a mold, and performing cooling in the mold for 6 seconds or more.

Thereby, high rigidity of the optical recording medium is secured.

According to one or more embodiments of the present disclosure, even when an optical recording medium is stored for a long period of time, warpage due to its own weight can be suppressed and music, videos, etc. recorded on the optical recording medium can be reproduced in a good state.

In addition, even when the optical recording medium is stored in a high-temperature environment, it is possible to suppress warpage due to its own weight and similarly obtain good reproduction characteristics.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, contents of the present disclosure will be described in the following order.
 [1. Structure of optical recording medium]
 [2. Manufacturing method]
 [3. Density measuring method]
 [4. Experiment results]
 [5. Conclusion]

Hereinafter, an optical recording medium, an optical recording medium substrate, and a method of manufacturing the optical recording medium substrate according to an embodiment will be described with reference to FIGS. 1A and 1B.

Technology of the present disclosure is applied to the optical recording medium substrate described here and applied to an optical recording medium using the optical recording medium substrate.

The present disclosure includes an example of a Blu-ray disc as the optical recording medium, an example of a Blu-ray disc substrate as the optical recording medium substrate, and an example of a method of manufacturing the Blu-ray disc substrate as the method of manufacturing the optical recording medium substrate as will be described hereinafter.

A range of application of the present disclosure is not limited to an optical recording medium serving as the Blu-ray disc, a Blu-ray disc substrate, and a method of manufacturing the Blu-ray disc substrate, and, for example, can be widely applied to various optical recording media such as a CD and a DVD, a substrate for various optical recording media, and a method of manufacturing the substrate for various optical recording media.

1. STRUCTURE OF OPTICAL RECORDING MEDIUM

Figure 1A:
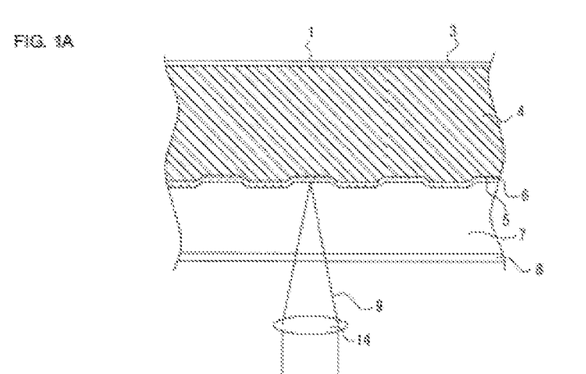
FIGS. 1A and 1B are explanatory diagrams of a layer structure of an optical recording medium of an embodiment.
Figure 1B:
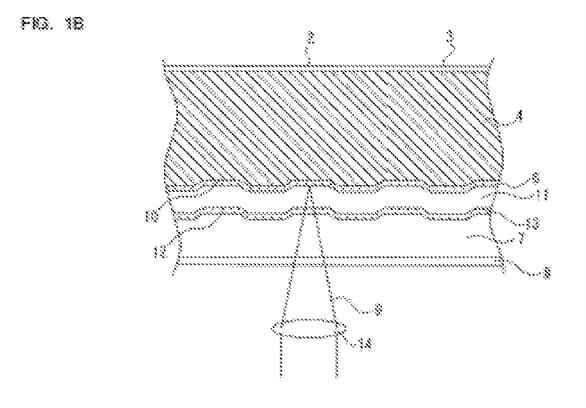

In FIGS. 1A and 1B, an example of a layer structure of the Blu-ray disc (optical recording medium 1) is included. FIG. 1A illustrates a layer structure of an optical recording medium 1 in which a so-called recording layer 5 is a single layer.

The optical recording medium 1 has an optical recording medium substrate 4 having one side on which the recording layer 5 is formed. As the optical recording medium substrate 4, a polycarbonate is used. In the polycarbonate, an average molecular weight is in a range from 15000 to 16000 and mass per unit volume at 25° C. is in a range from 1.1930 g/cm³ to 1.2000 g/cm³.

The recording layer 5 is formed in a concave/convex shape as a pit array pattern including pits and spaces. The optical recording medium substrate 4, for example, is formed with a thickness of about 1.1 mm A reflective film 6 for reflecting laser light 9 is formed for reproduction on the side having the recording layer 5 of the optical recording medium substrate 4 having the pit array pattern. A side opposite the recording layer 5 in the reflective film 6 serves as an incidence surface of the laser light 9 on which light is collected by an objective lens 14.

Although silver, a silver alloy, aluminum, or an aluminum alloy is usually used as the reflective film 6, the present disclosure is not limited thereto because the function is satisfied as long as light of 405 nm which is a wavelength of reproduction laser light can be efficiently reflected.

A transparent cover layer 7 having uniform and excellent surface smoothness is formed on an incidence surface side of the laser light 9 in the reflective film 6, that is, an information readout surface side. Further, a hard coat layer 8 serving as a protective layer is formed on a surface side of the transparent cover layer 7, that is, a side on which the laser light 9 is incident.

In this case, although the protective layer is formed by the transparent cover layer 7 and the hard coat layer 8, a total thickness of the transparent cover layer 7 and the hard coat layer 8, for example, becomes 95 to 105 μm. Although a ratio between the transparent cover layer 7 and the hard coat layer 8 is not particularly regulated, for example, the thickness of the hard coat layer 8 is usually 1.5 to 5 μm.

In addition, when viewed from an incidence side of the laser light 9 of the optical recording medium substrate 4, a surface (so-called label surface) of an opposite side is formed as a printing side 3 on which a label printing operation for displaying contents of the optical recording medium 1 has been performed.

The hard coat layer 8 may not necessarily be formed. For example, when a surface protection function by the transparent cover layer 7 is obtained, an example in which no hard coat layer 8 is formed may be considered. A disc manufacturing process can be simplified by omitting the formation of the hard coat layer 8.

In the Blu-ray disc, a two-layer disc structure having two recording layers 10 and 12 is also standardized. In FIG. 1B, a layer structure of a two-layer optical recording medium 2 is illustrated. As illustrated in FIG. 1B, the optical recording medium substrate 4 is provided as in the optical recording medium 1. As described above, a polycarbonate is used as the optical recording medium substrate 4. In the polycarbonate, an average molecular weight is in a range from 15000 to 16000 and mass per unit volume at 25° C. is in a range from 1.1930 g/cm³ to 1.2000 g/cm³.

On an incidence surface side of the laser light 9 of the optical recording medium substrate 4, a first recording layer 10 and a second recording layer 12 are formed via an intermediate layer 11.

The first recording layer 10 and the second recording layer 12 are formed in a concave/convex shape as a pit array pattern including pits and spaces. The intermediate layer 11, for example, is formed with a thickness of 20 to 30 μm.

The reflective film 6 is formed between the first recording layer 10 and the intermediate layer 11. A semi-transparent reflective film 13 is formed on a surface of the second recording layer 12. On the surface, the transparent cover layer 7 is formed. Further, the hard coat layer 8 serving as the protective layer is formed on a surface side of the transparent cover layer 7, that is, on a side on which the laser light 9 is incident. A total thickness of the transparent cover layer 7 and the hard coat layer 8, for example, is 75 μm.

As in the case of the optical recording medium 1, the hard coat layer 8 may not necessarily be formed.

The second recording layer 12 is formed by pressing a stamper on which a pit array pattern is pre-formed against the intermediate layer 11.

Because the Blu-ray disc (optical recording media 1 and 2) has a one-side reading method, that is, the transparent cover layer 7 only on one side of the optical recording medium substrate 4, as illustrated in FIGS. 1A and 1B, the Blu-ray disc is asymmetric in a thickness direction and is easily deformed due to the effect of a residual stress of each layer.

Therefore, the Blu-ray disc is constituted of a polycarbonate in which an average molecular weight is in a range from 15000 to 16000 and mass per unit volume at 25° C. is in a range from 1.1930 g/cm³ to 1.2000 g/cm³, so that the occurrence of warpage is particularly efficiently suppressed and good reproduction characteristics can be obtained.

2. MANUFACTURING METHOD

Hereinafter, a method of manufacturing the optical recording medium 1 will be briefly described.

(a) First, injection molding is performed to create the optical recording medium substrate 4. The injection molding is performed by melting polycarbonate pellets at a high temperature and filling the melted polycarbonate pellets in the mold.

(b) Next, the optical recording medium substrate 4 is cooled for a fixed time within a mold and extracted from the mold. Thereby, the optical recording medium substrate 4 with a thickness of about 1.1 mm is formed.

(c) Next, the recording layer 5 and the reflective film 6 are laminated on one side of the optical recording medium substrate 4 extracted from the mold using techniques such as sputtering, vapor deposition, and coating.

(d) Subsequently, the transparent cover layer 7 is formed by a spin-coating method or laminating a film of about 100 μm on the reflective film 6.

(e) Next, the transparent cover layer 7 is hardened by radiating ultraviolet light to the transparent cover layer 7 formed by spin coating or film lamination.

(f) Ultimately, the hard coat layer 8 is formed.

A manufacturing method associated with injection molding for the mold is also the same in manufacturing of a CD and a DVD.

Next, a method of manufacturing the two-layer optical recording medium 2 will be briefly described.

The method of manufacturing the two-layer optical recording medium 2 is substantially the same as in the case of the above-described single-layer optical recording medium 1 until the first recording layer 10 is formed.

After the first recording layer 10 is formed, the intermediate layer 11 is formed. The intermediate layer 11 is hardened by radiating ultraviolet light thereto. On the intermediate layer 11, the second recording layer 12 and the semi-transparent reflective film 13 are formed by a sputtering method, etc. Thereafter, the transparent cover layer 7 and the hard coat layer 8 are formed as in a single-layer disc.

In the technology of the present disclosure, injection molding is performed by filling a polycarbonate of a range in which an average molecular weight is 15000 to 16000 in the mold. A cooling time within the mold is set to 6 seconds or more. By setting the cooling time to 6 seconds or more, it is possible to have a characteristic that a density of the polycarbonate is 1.1930 [g/cm$^3$] to 1.2000 [g/cm$^3$]. Ultimately, the optical recording medium substrate 4 is formed by a polycarbonate in which an average molecular weight is in a range from 15000 to 16000 and a density at 25° C. is in a range from 1.1930 [g/cm$^3$] to 1.2000 [g/cm$^3$].

Thereby, it is possible to suppress the deformation of the optical recording media 1 and 2, prevent warpage due to long-term storage, and obtain good reproduction characteristics as a result.

3. DENSITY MEASURING METHOD

Hereinafter, an experiment in a warpage state when the optical recording medium 1 was stored for a fixed period of time in an upper limit of a use temperature environment will be described. First, a method of measuring the density of the optical recording medium substrate 4 used in this experiment will be described with reference to FIGS. 2A, 2B, and 2C.

Figure 2A:
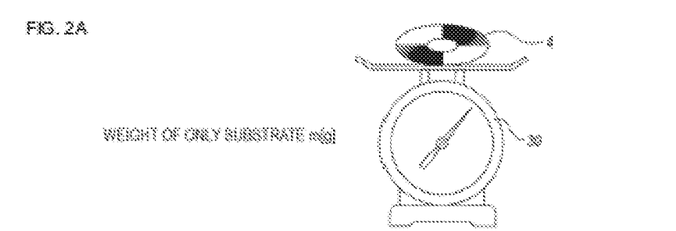
FIGS. 2A, 2B, and 2C are diagrams illustrating a method of measuring a density of an optical recording medium substrate.
Figure 2B:
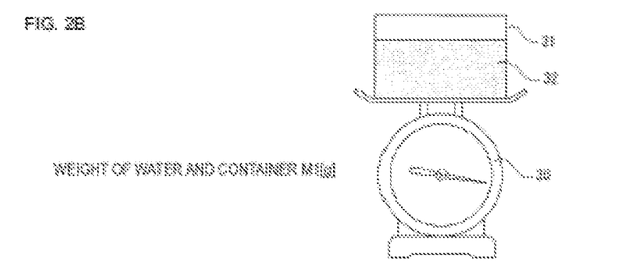
Figure 2C:
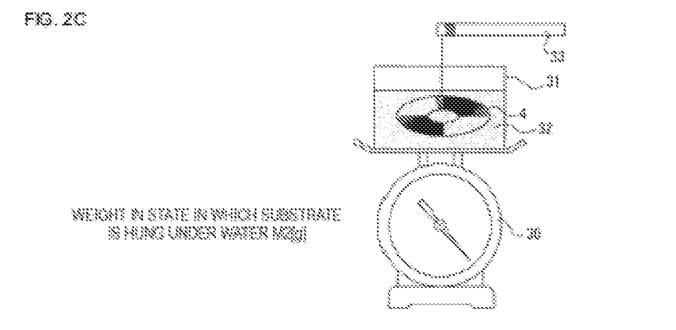

As the density measuring method, an underwater substitution method was used to accurately obtain the density even in a complex shape of the optical recording medium substrate 4.

As a gravimeter for measuring the density, an electronic force balance 30 capable of measuring up to a precision of 0.1 [mg] was used.

A classical balance or simply a balance is a measuring device which obtains the mass of a sample from the mass of a balance weight when it is balanced by applying leverage, placing the sample on one side of a force point or an action position, and placing the balance weight serving as a reference on the other side. On the other hand, in an electronic force balance 30, a numerical value of weight is immediately obtained by merely placing a physical object to be measured without the need of miscellaneous operations.

In addition, in the optical recording medium substrate 4 to be measured, an inorganic film through which water of 10 [nm] did not pass was formed on both sides of the optical recording medium substrate 4 in order to suppress the degradation of precision of a density due to absorption.

First, the weight of the optical recording medium substrate 4 was measured. The weight was measured by placing the optical recording medium substrate 4 on the electronic force balance 30 as illustrated in FIG. 2A. At this time, the weight was assumed to be m [g].

Next, the weight of a container 31 containing water 32 (pure water) was measured as illustrated in FIG. 2B. At this time, the weight was assumed to be M1 [g]. Further, the weight was measured when the optical recording medium substrate 4 was hung and floated by a support rod 33 under the water 32 as illustrated in FIG. 2C. At this time, the weight was assumed to be M2 [g].

From the above-described measurement results, when a density of water corresponding to a water temperature at the time of weight measurement was p [g/cm$^3$], (M2−M1)/p was the volume of the optical recording medium substrate 4. A density A of the optical recording medium substrate 4 could be obtained by dividing m, which is the weight of the optical recording medium substrate 4, by (M2−M1)/p.

Ultimately, an expression for obtaining the density A [g/cm$^3$] of the optical recording medium substrate 4 is as follows.

$$A=pm/(M2-M1).$$

According to the above method, the density of the optical recording medium substrate 4 was obtained.

4. EXPERIMENT RESULTS

Next, the experiment results of a warpage state when a general optical recording medium was stored for a fixed period of time in an upper limit of a usage environment temperature and a warpage state of the optical recording medium 1 having the optical recording medium substrate 4 of this embodiment will be described with reference to FIGS. 3A, 3B, 4A, 4B, 5, and 6.

Figure 3A:
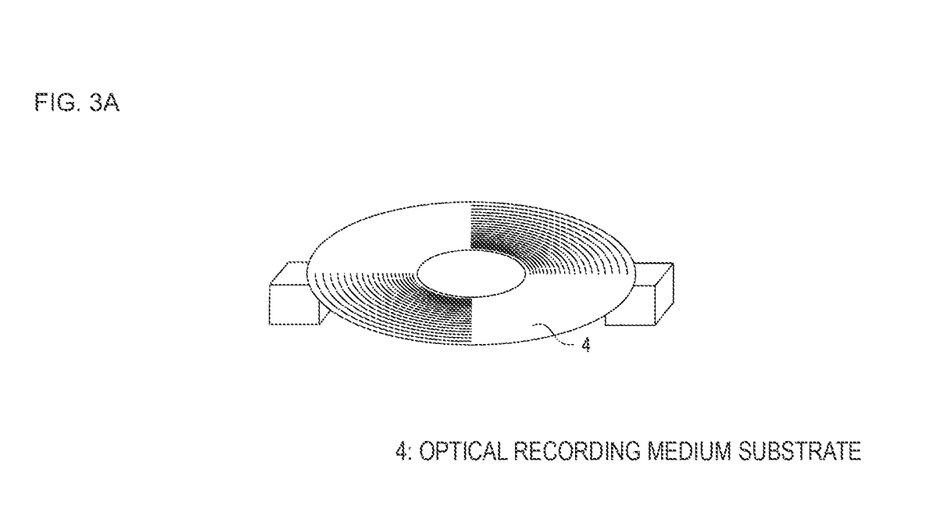
FIGS. 3A and 3B are diagrams illustrating a change in a shape when the optical recording medium is held in a horizontal state.
Figure 3B:
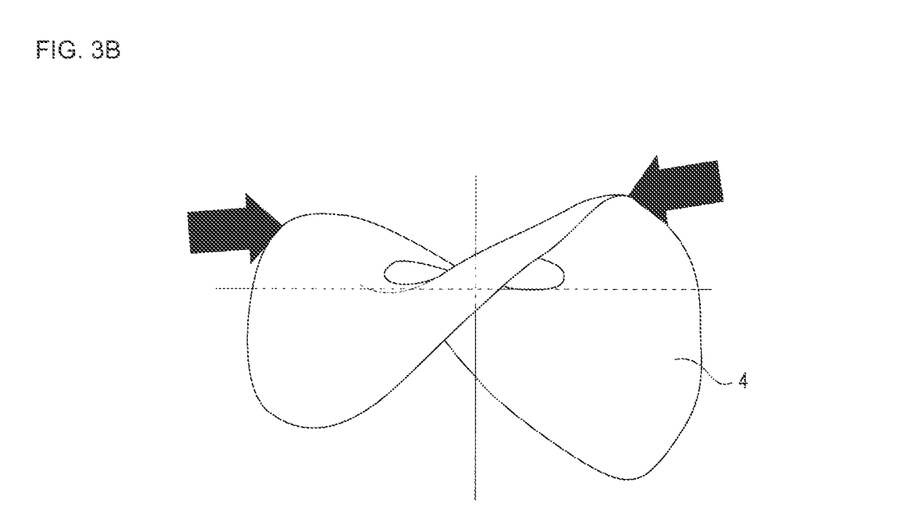

FIGS. 3A and 3B visually illustrates a storage state and a deformation state of the general optical recording medium (optical disc) and illustrates a deformation state when the optical recording medium was supported at two points and stored in the horizontal state. FIG. 3A corresponds to the case in which there is no deformation and no warpage occurs. FIG. 3B illustrates a deformation state when storage was performed within a constant-temperature layer at a temperature of 55° C. for 96 hours. For ease of understanding, FIG. 3B is illustrated in an exaggerated manner. Although portions (arrows) supported as illustrated in FIG. 3B are not deformed, the other portions are bent and drooped due to their own weight or deformed in an overall potato chip shape. In this case, a recording or reproduction operation using a laser is not normal. This deformation is a cause of malfunction.

Figure 4A:
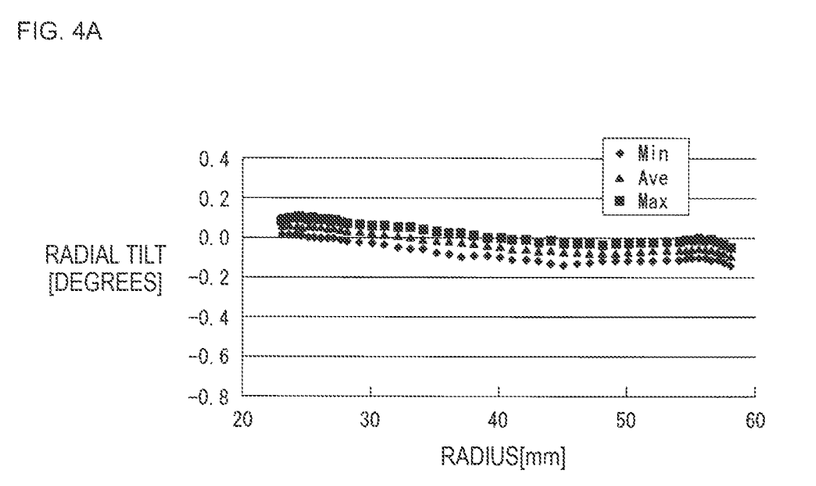
FIGS. 4A and 4B are diagrams illustrating a measurement result of warpage of the optical recording medium when stored in the horizontal state.
Figure 4B:
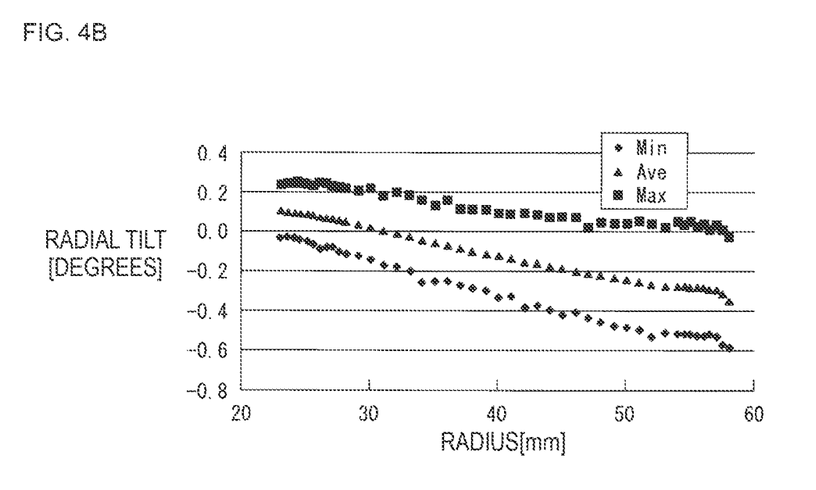

FIGS. 4A and 4B are graphs obtained by specifically measuring a deformation amount (warpage) of the general optical recording medium illustrated in FIGS. 3A and 3B as a tilt (angle) from the center of the optical recording medium. The horizontal axis represents a radius of the optical recording medium and the vertical axis represents the angle from the center of the optical recording medium. This tilt (angle) corresponds to the warpage of the optical recording medium. FIGS. 4A and 4B, represent a minimum value, represent an average value, and represent a maximum value. When the tilt exceeds ±0.3 degrees, recording or reproduction using a laser is impeded. This is because aberration occurs in a light spot (focus).

FIG. 4A corresponds to the case of FIG. 3A, and illustrates the tilt of the optical recording medium before storage (immediately after manufacturing). In this case, a difference between a maximum value and a minimum value of the tilt is in a range of ±0.2 degrees, which is substantially flat. This is obviously within ±0.3 degrees. Accordingly, neither recording nor reproduction using laser is impeded.

FIG. 4B corresponds to the case of FIG. 3B, and is a graph illustrating a tilt of the optical recording medium after storage at a temperature of 55° C. for 96 hours in a two-point support state. A difference between the maximum value and the minimum value reaches ±0.6 degrees (a radius of about 58 mm) as illustrated in FIG. 4B. In this case, a recording or reproduction operation is impeded, resulting in inconvenience.

Figure 5:
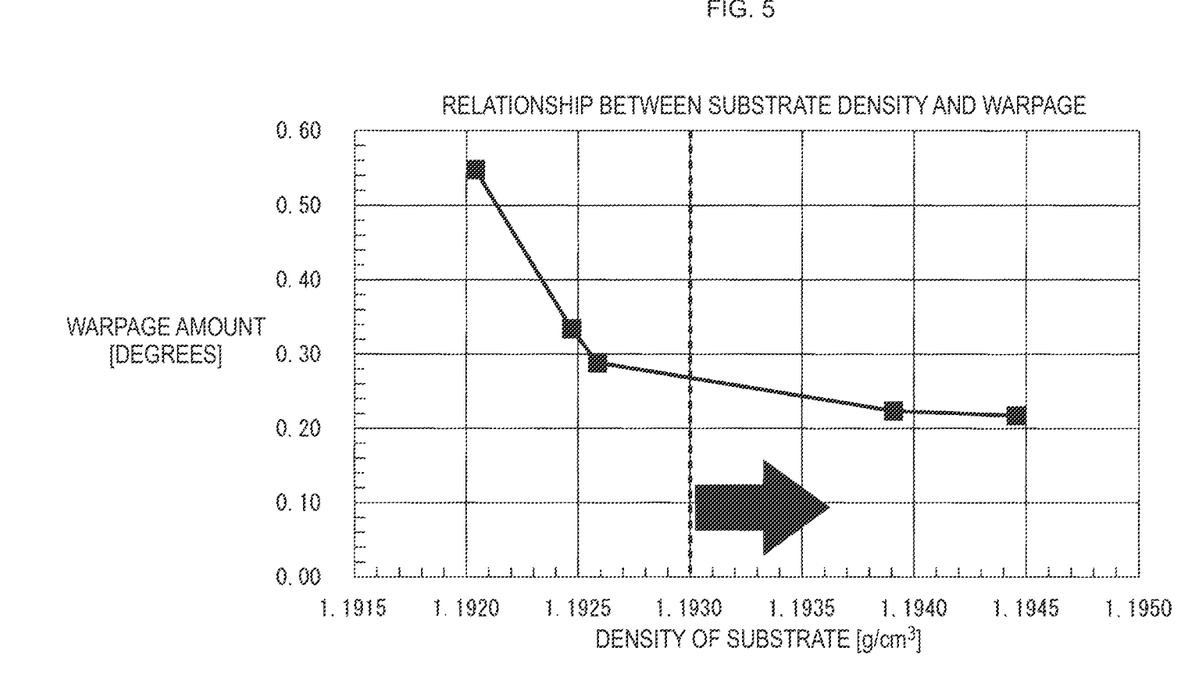
FIG. 5 is a diagram illustrating a relationship between a density and warpage of the optical recording medium substrate.

FIG. 5 illustrates a relationship between a density and warpage (tilt) of the optical recording medium substrate 4 having a polycarbonate in which an average molecular weight is 15000 or 16000 as the optical recording medium substrate 4. Here, the density refers to mass per unit volume. While the warpage of the optical recording medium substrate 4 is abruptly increased in a region in which a density at a temperature of 25° C. is 1.1926 [g/cm$^3$] or less as illustrated in FIG. 5, a warpage amount is gently decreased in a region in which the density is above 1.1926 [g/cm$^3$]. When the density is 1.1920 [g/cm$^3$], the warpage amount is about 0.56 degrees.

On the other hand, when the density at the temperature of 25° C. exceeds 1.1926 [g/cm$^3$], the warpage amount is decreased to 0.28 degrees or less. Therefore, the use of a polycarbonate in which the density is 1.1930 [g/cm$^3$] or more for the optical recording medium substrate 4 may sufficiently suppress the warpage and may be practically preferred.

From the above-described measurement results, if a polycarbonate in which an average molecular weight is in a range from 15000 to 16000 and mass per unit volume at 25° C. is 1.1930 [g/cm$^3$] or more is used as the optical recording medium substrate 4, the warpage can be reduced and good recording or reproduction characteristics of the optical recording media 1 and 2 can be obtained.

The density of the polycarbonate can be controlled under appropriate conditions such as molding conditions and an annealing process. Here, the density can be set to a predetermined value by setting a cooling time within the mold to, for example, 6 seconds, as will be described later.

In addition, an upper limit of the density of the polycarbonate is generally 1.2000 [g/cm$^3$] Therefore, the polycarbonate of the present disclosure in which an average molecular weight is in a range from 15000 to 16000 and mass per unit volume at 25° C. is in a range from 1.1930 [g/cm$^3$] to 1.2000 [g/cm$^3$] is preferred.

Figure 6:
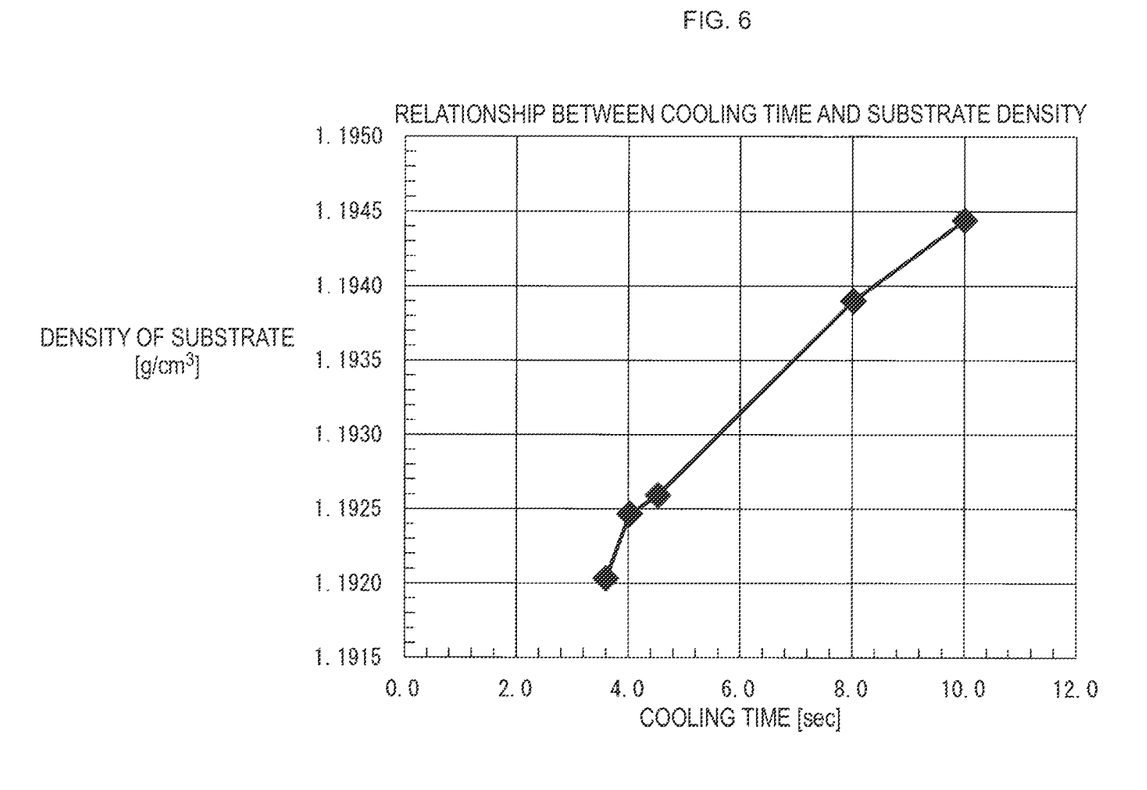
FIG. 6 is a diagram illustrating a relationship between a cooling time in injection molding of the optical recording medium substrate and a density.

FIG. 6 is a diagram illustrating a relationship between a cooling time within a mold of the optical recording medium substrate 4 and a density. The horizontal axis represents the cooling time and the vertical axis represents the density. When the cooling time is increased as illustrated in FIG. 6, the density of the optical recording medium substrate 4 is increased. If the cooling time is 6 seconds or more, the density of the optical recording medium substrate 4 can be set to 1.1930 g/cm$^3$ or more.

Therefore, it is possible to suppress the occurrence of warpage of the optical recording medium substrate 4 and the optical recording medium 1 having the same by setting the cooling time within the mold to 6 seconds or more upon molding the optical recording medium substrate 4.

5. CONCLUSION

According to the above, when an optical recording medium substrate which is a polycarbonate in which an average molecular weight is in a range from 15000 to 16000 and mass per unit volume at 25° C. is in a range from 1.1930 g/cm$^3$ to 1.2000 g/cm$^3$ is used for the optical recording medium, the occurrence of warpage is particularly efficiently suppressed and good reproduction characteristics can be obtained.

In addition, it is possible to prevent the deformation of a disc in a CD and DVD as well as a Blu-ray disc, prevent the warpage of the disc due to long-term storage, and obtain good reproduction characteristics.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing an optical recording medium substrate, comprising:
    forming the optical recording medium substrate by a polycarbonate in which an average molecular weight is in a range from 15000 to 16000 in a mold;
    setting a cooling time of the polycarbonate in the mold to 6 seconds or more to control a density of the polycarbonate in a range of 1.1930 g/cm$^3$ (gram/cubic centimeter) to 1.2000 g/cm$^3$ at 25° C. (Celsius); and
    performing cooling in the mold for the set cooling time, wherein a warpage of the optical recording medium substrate is 0.28 degrees or less in a region where the density of the polycarbonate is above 1.1930 g/cm$^3$ at 25° C.

2. The method of manufacturing the optical recording medium substrate according to claim 1, further comprising forming a transparent cover layer on an information readout surface side of the optical recording medium substrate.

3. The method of manufacturing the optical recording medium substrate according to claim 1, wherein the optical recording medium substrate has a thickness of 1.1 mm.

4. The method of manufacturing the optical recording medium substrate according to claim 1, further comprising forming a first recording layer and a second recording layer via an intermediate layer in the optical recording medium substrate.

5. The method of manufacturing the optical recording medium substrate according to claim 4, wherein the intermediate layer is formed with a thickness of 20 to 30 μm.

* * * * *